(12) United States Patent
Fonken (10) Patent No.: US 10,983,605 B2
(45) Date of Patent: Apr. 20, 2021

(54) THREE-DIMENSIONAL OBJECT POSITION TRACKING SYSTEM

(71) Applicant: Marbl Limited, Fort Collins, CO (US)

(72) Inventor: Matthew G. Fonken, Fort Collins, CO (US)

(73) Assignee: Marbl Limited, Fort Collins, CO (US)

( * ) Notice: Subject to any disclaimer, the term of this patent is extended or adjusted under 35 U.S.C. 154(b) by 237 days.

(21) Appl. No.: 15/669,804

(22) Filed: Aug. 4, 2017

(65) Prior Publication Data

US 2019/0042001 A1    Feb. 7, 2019

(51) Int. Cl.
*G06F 3/0346* (2013.01)
*G06F 3/0354* (2013.01)

(52) U.S. Cl.
CPC ........ *G06F 3/0346* (2013.01); *G06F 3/03545* (2013.01)

(58) Field of Classification Search
CPC ....... G01S 1/70; G06F 3/0346; G06F 3/03545
See application file for complete search history.

(56) References Cited

U.S. PATENT DOCUMENTS

| | | | |
|---|---|---|---|
| 6,577,299 B1* | 6/2003 | Schiller | G06F 3/0325 345/158 |
| 9,122,334 B1* | 9/2015 | Olsen | G06F 3/03545 |
| 2016/0306447 A1* | 10/2016 | Fleck | G06F 3/03545 |
| 2017/0017323 A1* | 1/2017 | Yu | G02B 27/0172 |
| 2017/0269721 A1* | 9/2017 | Park | A61L 9/12 |
| 2018/0088685 A1* | 3/2018 | Sang | H04N 21/42222 |
| 2019/0004622 A1* | 1/2019 | O'Brien | G06T 19/006 |

* cited by examiner

*Primary Examiner* — Stacy Khoo
(74) *Attorney, Agent, or Firm* — Craig R. Miles; CR Miles P.C.

(57) ABSTRACT

A hand-held controller and a positional reference device for determining the position and orientation of the hand-held controller within a three-dimensional volume relative to the location of the positional reference device. An input/output subsystem in conjunction with processing and memory subsystems can receive a reference image data captured by a beacon sensing device combined with inertial measurement information from inertial measurement units within the hand-held controller. The position and orientation of the hand-held controller can be computed based on the linear distance between a pair of beacons on the positional reference device and the reference image data and the inertial measurement information.

13 Claims, 12 Drawing Sheets

THREE-DIMENSIONAL OBJECT POSITION TRACKING SYSTEM

I. BACKGROUND

Many modern software applications include three-dimensional elements, particularly in industries such as engineering, graphic design, gaming, and medical. Nevertheless, conventional human interface devices may limit the user's control to two dimensions, despite the three-dimensional input or output capabilities of modern software. Accordingly, a device, method, and system for providing a user with three-dimensional control of software may be useful in assisting the user to operate software with better precision and accuracy.

II. SUMMARY OF THE INVENTION

A broad object of embodiments can be a system including one or more of a hand-held controller and a positional reference device operable for determining a position or an orientation of the hand-held controller within a three-dimension volume. In one embodiment, the system includes a beacon sensing device for optically capturing an image of the positional reference. An input/output subsystem in conjunction with processing and memory subsystems can receive the reference image data from the beacon sensing device combined with inertial measurement information from inertial measurement units within the hand-held controller. The position and orientation of the hand-held controller can be computed based on the linear distance between a pair of beacons on the positional reference device and the inertial measurement information.

Another broad object of embodiments can be to provide at least one non-transitory computer readable medium containing processor readable code for programming one or more processors to perform a method including one or more of: providing a positional reference device; detecting with a beacon sensing device at least two location beacons coupled in a fixed spaced apart relation to the positional reference device; generating inertial sensor signals by way of causing movement of a hand-held controller; generating reference data from the beacon sensing device; receiving the inertial sensor signals; receiving the reference data; and, computing a position and an orientation of the hand-held controller relative to the positional reference device.

Naturally, further objects of the invention are disclosed throughout other areas of the specification, drawings, photographs, and claims.

IV. DETAILED DESCRIPTION

From the descriptions which now follow, it will become readily apparent how the present invention lends itself to the use of hand-held controllers in a touch free, gesture-control environment with a display screen, as well as in a touch screen environment with display screen capabilities.

With this in mind, the significant improvements and special contributions made to the art of three-dimensional styli and positional reference devices according to the invention will become more fully apparent as the invention description which now follows is read in conjunction with the accompanying drawings.

Figure 1:
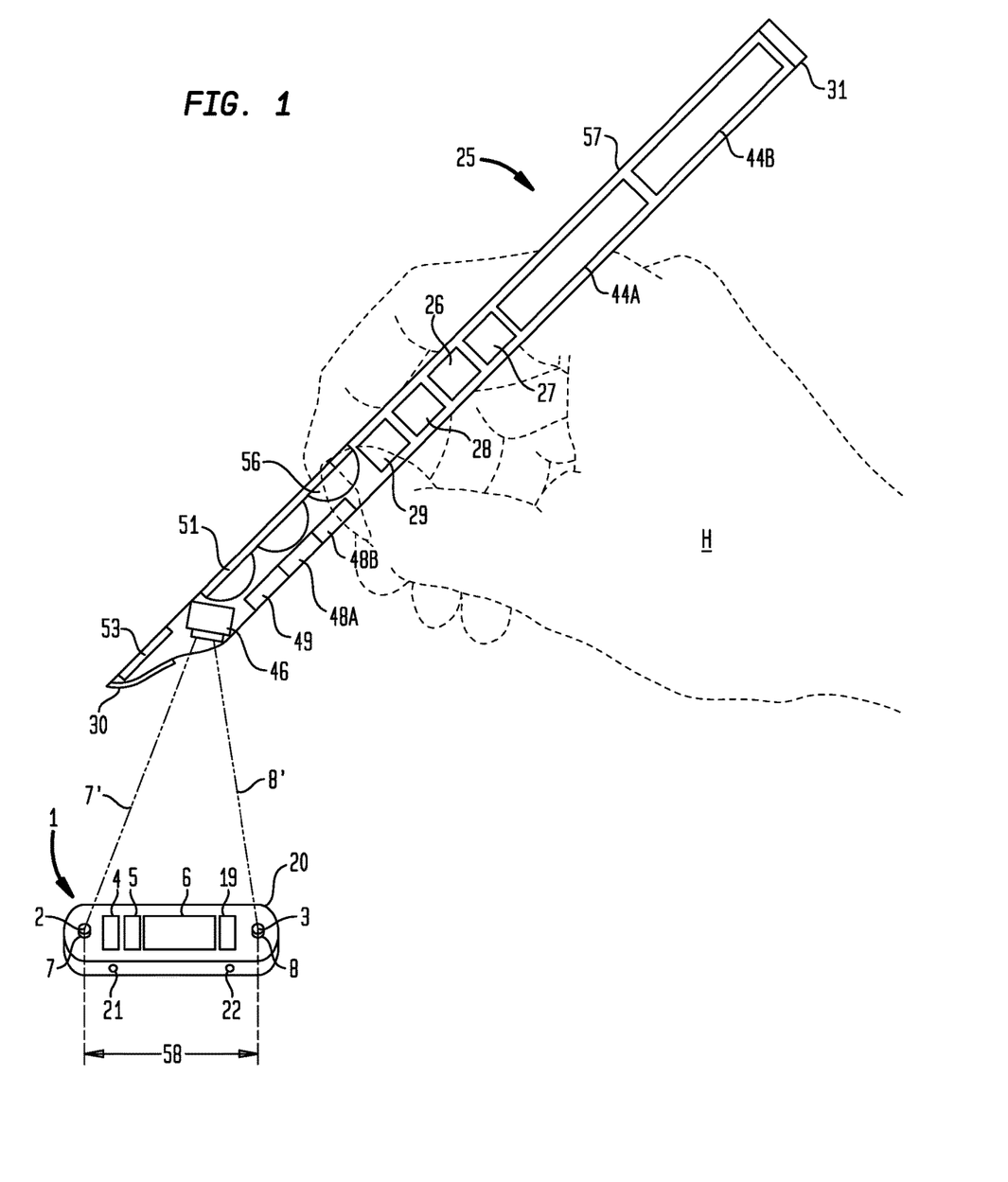
FIG. 1 is a top, perspective view of an embodiment of a positional reference device in operation with a hand-held controller held by a user.

Referring to the figures wherein like reference numerals denote like structure throughout the specification, with reference primarily to FIG. 1 which depicts a positional reference device (1) and a hand-held (H) controller (25). As to particular embodiments, the hand-held controller (25) in signal transmission with the positional reference device (1), can be used by a user to manipulate objects on a computer display screen and virtual objects within a three-dimensional cubic space.

Figure 2:
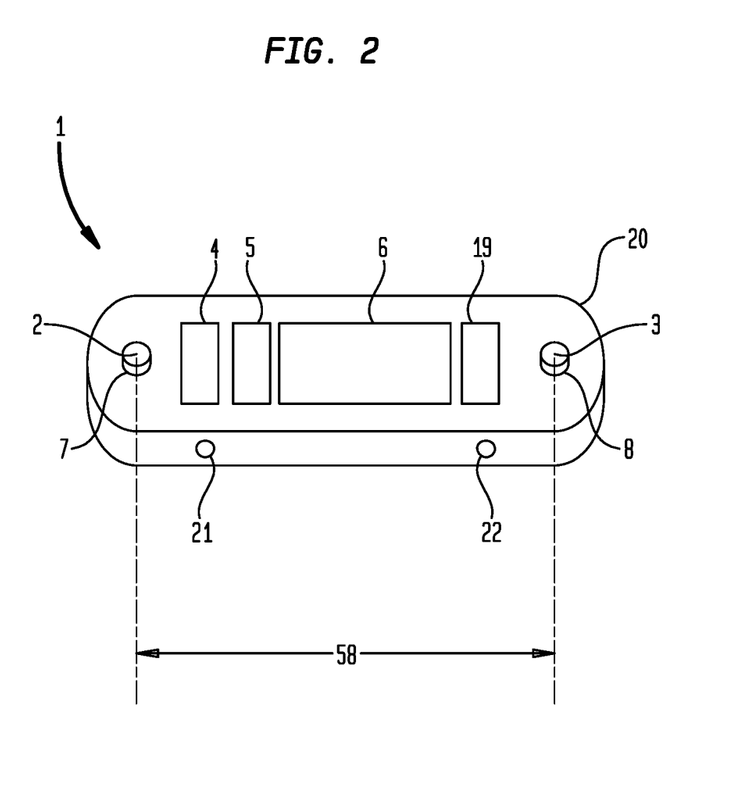
FIG. 2 is a perspective view of an embodiment of a positional reference device.

Now referring primarily to FIG. 2, positional reference device (1) can include one or more location beacons (2, 3) and emitters (7, 8), microprocessor subsystems (4), batteries (19), and magnets (21, 22) with other components such as power system (5), positional reference device non-transitory computer readable medium (12) (as shown in the illustrative example of FIG. 3), graphics circuitry, audio circuitry, and other circuitry for performing computer tasks, such as those described herein, enclosed within casing (20).

Figure 3:
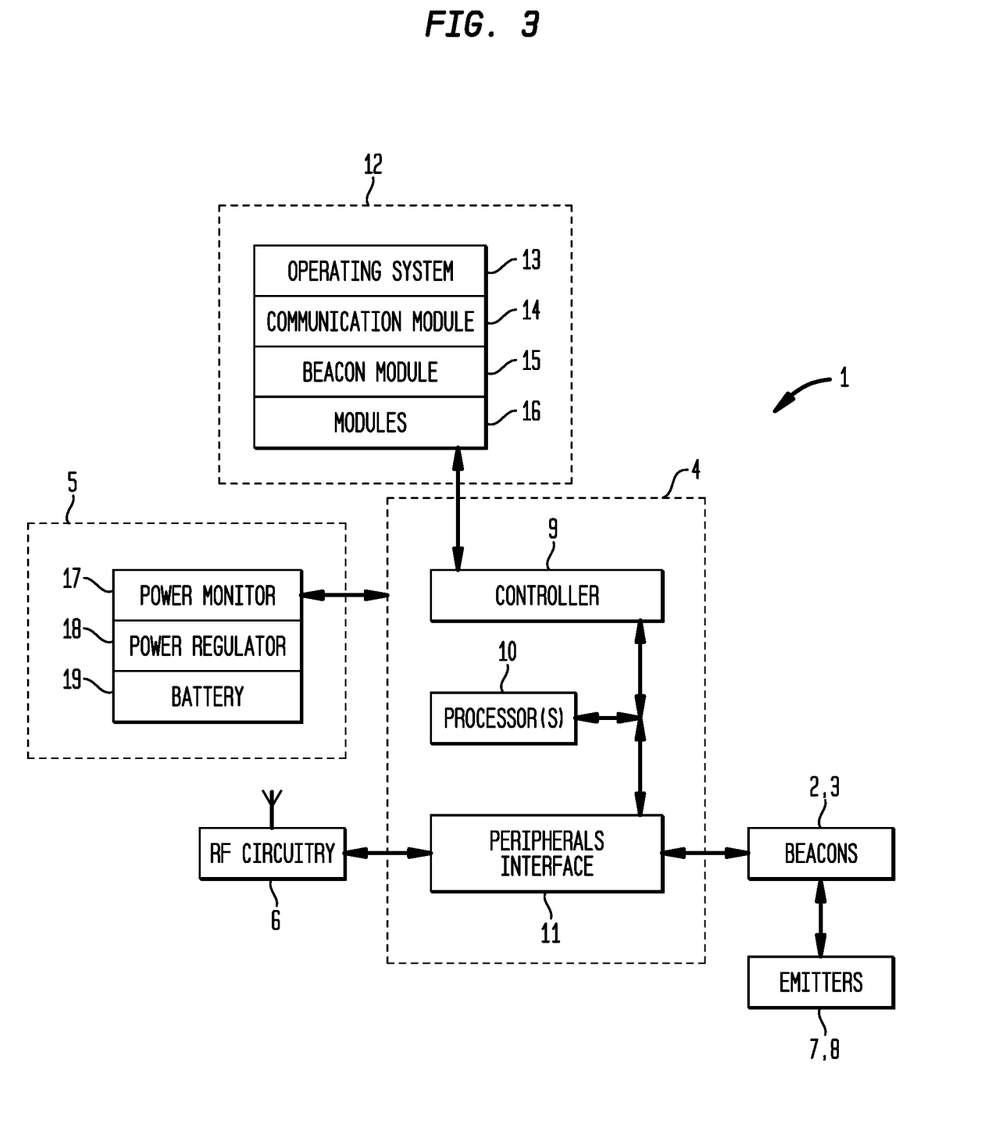
FIG. 3 is a diagrammatic view of an embodiment of a positional reference device.

With reference primarily to FIG. 3, the microprocessor subsystem (4) can include one or more of a controller (9), processor(s) (10), or a peripherals interface (11) which are executable to perform the methods described herein. In addition, positional reference device (1) can further include one or more of a power system (5), having a power monitor (17), power regulator (18), and battery (19) with radio frequency circuitry (6) for powering the positional reference device (1) in operable communication with the hand-held controller (25) and a computer device.

In some embodiments of the positional reference device (1), microprocessor subsystem (4) is communicatively coupled to a non-transitory computer readable medium (12) containing computer-executable instructions. Microprocessor subsystem (4) can, as an illustrative example, be a printed circuit board having one or more various elements disposed thereon for storing data as a non-transitory computer readable media (12). The elements of the non-transitory computer readable medium (12) can be formed as an integrated circuit or chip having flash memory or any other type of memory structure for storing data. Further, non-transitory computer readable media (12) of the positional reference device (1) can include any of various types of memory devices or storage devices.

The non-transitory computer readable medium (12) of the positional reference device may include other types of memory as well or combinations thereof. Either together or separately, the microprocessor (4) and non-transitory computer readable medium (12) can be located in the positional reference device (1) as contemplated by the embodiments disclosed herein or as part of a first or second computer device, in which the first and second computer devices are connected to one another over a network, such as the Internet.

Non-transitory computer readable medium (12) of the positional reference device (1) may store one or more computer programs or software components according to various embodiments of the present disclosure. For example, non-transitory computer readable medium (12) can store an operating system (13), a communication module (14), and a beacon module (15) which are executable to perform the methods described herein. Capacity for storing additional modules (16) can also, but need not necessarily, be included in non-transitory computer readable medium (12) of the positional reference device (1).

In addition, it should be understood that communication protocols can be used for physically and communicatively coupling the positional reference device (1) to a computing device, in order to facilitate data transfer between the positional reference device (1) and a computing device. Communication protocols can include communication module (14) (as shown in the illustrative example of FIG. 3). Communication module (14), in addition to the descriptions above, can include a physical transmission medium, such as a bus, network, or other physical transmission medium that conveys signals such as electrical, electromagnetic, or digital signals.

Various embodiments further include receiving or storing instructions or data implemented in accordance with the foregoing description of the non-transitory computer readable medium (12) of the positional reference device (1).

With continuing reference to primarily FIGS. 2, and 3 the positional reference device (1) can include location beacons (2, 3), emitters (7, 8) a distance (58) between the location beacons (2, 3), and beacon sensing signals (7', 8'), yet to be described herein. Magnets (21, 22) may be disposed on one or more sidewalls of the casing (20), or at other locations, to allow the positional reference device (1) to attach to a laptop computer or the like.

It should be appreciated that any or all of the various elements shown within or made up in combination within the positional reference device (1) may be electrically or physically connected to one another.

Figure 4:
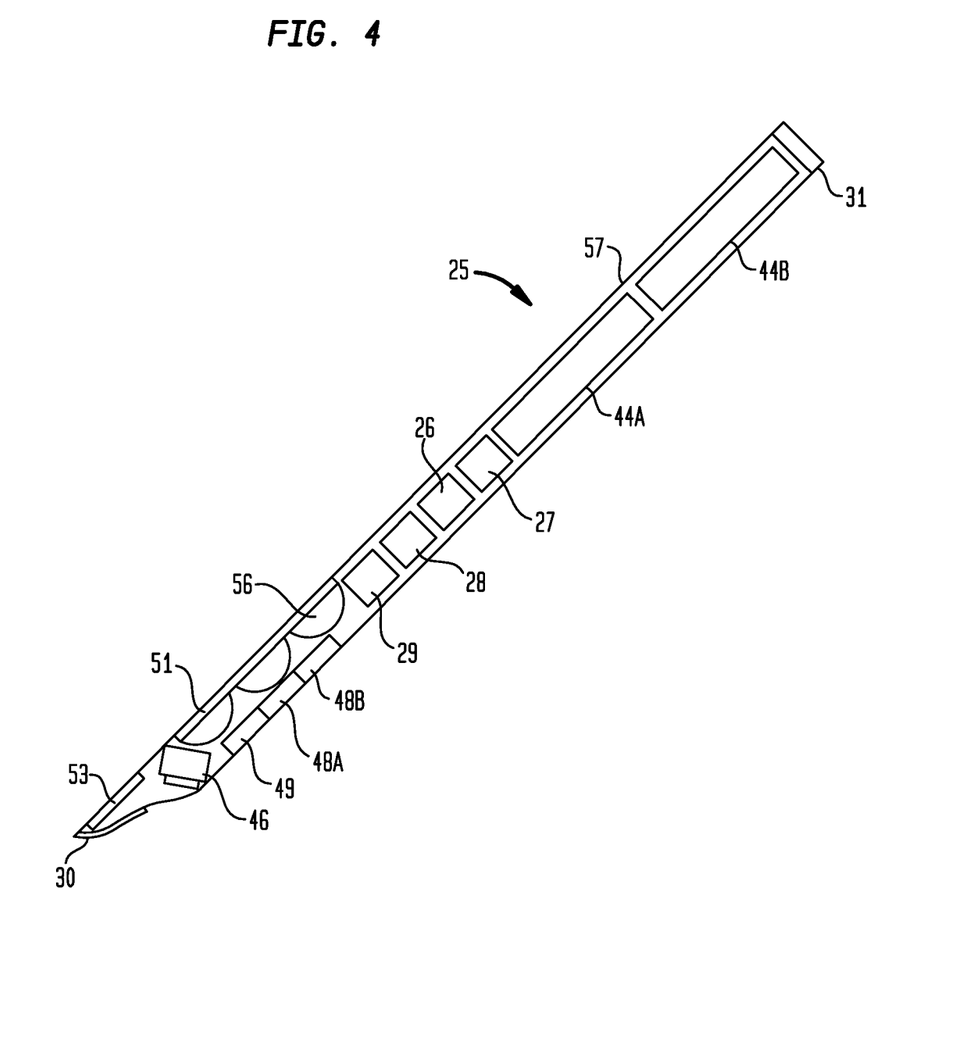
FIG. 4 is a side view of an embodiment of a hand-held controller.
Figure 5:
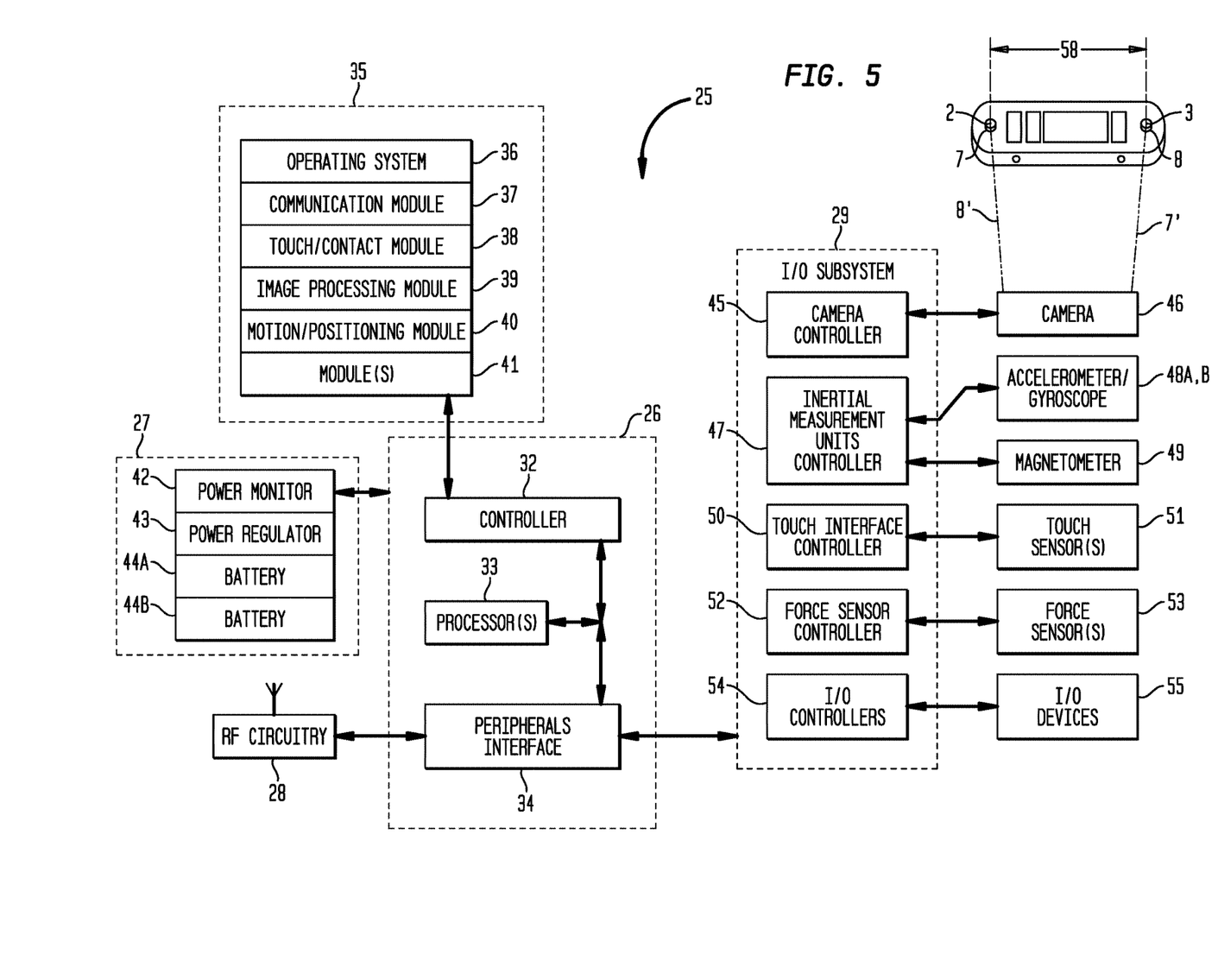
FIG. 5 is a diagrammatic view of an embodiment of a hand-held controller.

Now referring primarily to FIGS. 1, 4, and 5, hand-held controller (25) can include a beacon sensing device (46). In an embodiment, the beacon sensing device (46) can be a camera, such as a fine scale camera or other suitable imaging device. In another embodiment, the beacon sensing device (46) can be a pinhole camera with minimal lens requirement. The beacon sensing device (46) can be another suitable type of image sensor known for use in low light environments. Various embodiments can further include optic and image sensors and devices for receiving or storing instructions or data implemented in accordance with the foregoing description upon activation of the beacon sensing device controller (45) with the microprocessor subsystem (26), input/output subsystem (29) and non-transitory computer readable medium (35) of the hand-held controller (25), yet to be described herein. Furthermore, optic and image sensors or a camera used as a beacon sensing device (46) may be contained within the pen shaped casing (57) of the hand-held controller (25) or may otherwise be associated with the hand-held controller (25).

By manipulating the hand-held controller (25), beacon sensing device (46) optically identifies beacons (2, 3) on either end of the positional reference device (1). The beacons (2, 3) are spaced apart a fixed distance (58). The distance (58) can be any desired distance (58), particularly within a focal range of the desired beacon sensing device (46). It is contemplated that the beacon sensing device (46) can include lens, focal length, and pixel pitch capabilities with optical resolution at a predetermined distance (58). In one embodiment, the beacons (2, 3) can be physical objects. The physical objects can have a color, form, or texture contrasting with the positional reference device (1) and the casing (20). In some embodiments, signals (7', 8') transmitted from emitters (7, 8), respectively can be used as the beacons (2, 3). Signals (7', 8') may be radioluminescence, photoluminescence, or electroluminescence. In another embodiment, signals (7', 8') can be infrared light.

Now referring primarily to FIG. 5, microprocessor subsystem (26) and non-transitory computer readable medium (35) of the hand-held controller (25) in some embodiments, can be complimentary in application to the positional reference device (1). Thus, microprocessor subsystem (26) of the hand-held controller (25) can be, for example, a printed circuit board having one or more elements disposed thereon for storing data as non-transitory computer readable media (35), containing computer-executable instructions. The elements of the non-transitory computer readable medium (35) can be formed as an integrated circuit or chip having flash memory or any other type of memory structure for storing data. Further, non-transitory computer readable media (35) of the hand-held controller (25) can include any of various types of memory devices or storage devices.

The non-transitory computer readable medium (35) of the hand-held controller (25) may include other types of memory as well or combinations thereof. Either together or separately, the microprocessor (26) and non-transitory computer readable medium (35) may be located in the hand-held controller (25) as contemplated by the embodiments disclosed herein or as part of a first or second computer device, in which the first and second computer devices are connected to one another over a network, such as the Internet.

Non-transitory computer readable medium (35) of the hand-held controller (25) may store one or more computer programs or software components according to various embodiments of the present disclosure. For example, non-transitory computer readable medium (35) can store operating system (36), communication module (37), touch/contact module (38), image processing module (39), and motion processing module (40) which are executable to perform the methods described herein. Capacity for storing additional modules (41) can also, but need not necessarily, be included in non-transitory computer readable medium (35) of the hand-held controller (25).

In addition, communication protocols can be used for physically and communicatively coupling the hand-held controller (25) to a computing device, in order to facilitate data transfer between the hand-held controller (25) and a computing device. Communication protocols can include communication module (37) as diagrammed in the example of FIG. 5. Communication module (37), in addition to the descriptions above, can include a physical transmission medium, such as a bus, network, or other physical transmission medium that conveys signals such as electrical, electromagnetic, or digital signals.

Various embodiments further include receiving or storing instructions or data implemented in accordance with the foregoing description of the non-transitory computer readable medium (35) of the hand-held controller (25) with the positional reference device (1) and one or more computing devices.

It should be appreciated that hand-held controller (25) may be wirelessly or otherwise electromagnetically connected to a computer device through communication module (37) such that an image of the location beacons (2, 3) as captured by the beacon sensing device (46) can be transmitted to computer a computer device to further include receiving or storing instructions or data implemented in accordance with the foregoing description of the present embodiments.

In addition to the non-transitory computer readable medium (35) of the hand-held controller (25), FIGS. 1, 4, and 5 depict components of other various subsystems including the microprocessor (26) and input/output (29) subsystems. As further diagrammed in FIG. 5, the microprocessor subsystem (26) can include one or more of a controller (32), processor(s) (33), and a peripherals interface (34) which are executable to perform the methods described herein. The input/output subsystem (29) includes beacon sensing device/camera controller (45), inertial measurement units controller (47), touch interface controller (50), and force sensor controller (52) which are executable to perform the methods described herein. Capacity for storing additional controllers (54) can, but need not necessarily, be included in input/output subsystem (29).

Referring primarily to FIGS. 1, 4, and 5, hand-held controller (25) can include inertial measurement units, such as multiaxis accelerometer (48A), multiaxis gyroscope (48B), and multiaxis magnetometer (49). Providing additional spatial information and inertial measurements to the microprocessor (26) and non-transitory computer readable medium (35) via the inertial measurement units controller (47), each of the multiaxis accelerometer (48A), multiaxis gyroscope (48B), and multiaxis magnetometer (49) can be housed within the pen-shaped casing (57) of the hand-held controller (25). Specifically, the inertial measurements can be one or more of acceleration, vibration, shock, tilt, and rotation. It is contemplated that accelerometer (48A), gyroscope (48B), and magnetometer (49) can be any commercially available three-axis motion sensing device. Each of accelerometer (48A), gyroscope (48B), and magnetometer (49) can, but need not necessarily, be microelectromechanical systems technology.

According to various embodiments of the present disclosure, accelerometer (48A) can detect a current rate of acceleration and gyroscope (48B) can detect changes in rotational attributes, such as pitch, roll and yaw. Magnetometer (49) can be used, for example, to assist in calibration against orientation drift. The magnetometer (49) may be used instead of or in addition to accelerometer (48A) or gyroscope (48B).

In some embodiments, the inertial measurement units (48A, 48B, and 49) can be used in conjunction with the beacon sensing device (46) to generate three-dimensional position and orientation from a two dimensional, linear image, such as the beacons (2, 3) at the predetermined distance (58).

According to the principles of Tait-Bryan angles, three-dimensional orientation can be fully described by a combination of three angles. These three angles are commonly referred to as roll $\phi$, pitch $\varphi$, and yaw $\psi$ and are attained by rotating along a single axis three times. Specifically, in a three-dimensional coordinate system having an x-axis (X), y-axis (Y), and z-axis (Z), hand-held controller (25) can be rotated around Z first to create the yaw $\psi$ angle then around Y to create the pitch $\theta$ angle, and finally around X to create the roll $\phi$ angle. These three angles can be calculated by the inertial measurement units of the present disclosure, such as accelerometer (48A), gyroscope (48B), or magnetometer (49).

With continuing reference to FIG. 5, various other sensors can be housed within the hand-held controller (25) including touch sensor(s) (51) or force sensor(s) (53) which are executable to perform the methods described herein. Capacity for storing more sensors (55) can, but need not necessarily, be included.

Hand-held controller (25) can include power system (27), having a power monitor (42), power regulator (43), and battery (44A, 44B) with radio frequency circuitry (28) for powering the hand-held controller (25) in operable communication with the positional reference device (1) and a computer device having a display screen.

It should be appreciated that any or all of the various elements shown within or made up in combination within the hand-held controller (25) may be electrically or physically connected to one another.

Figure 6A:
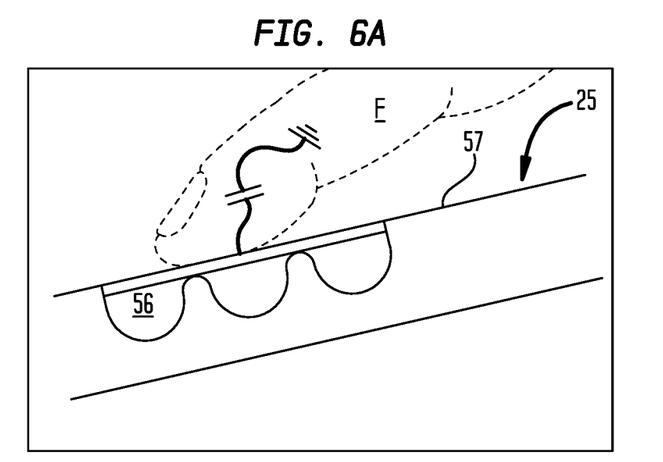
FIG. 6A is a side view of an embodiment of a hand-held controller and a user finger activating a touch sensitive pad of a hand-held controller.
Figure 6B:
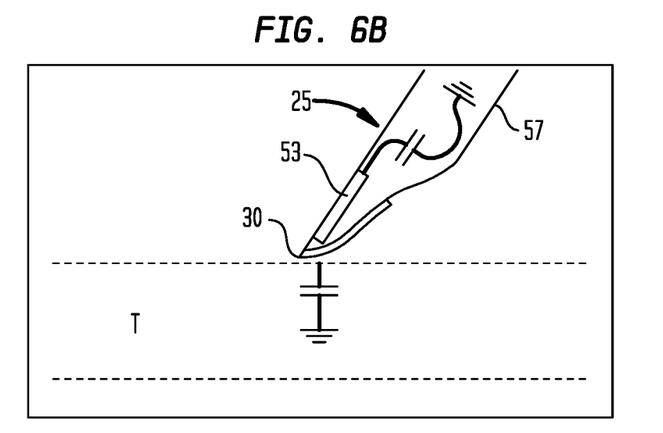
FIG. 6B is a side view of an embodiment of a hand-held controller and a tip of the hand-held controller activating a touch screen tablet.
Figure 6C:
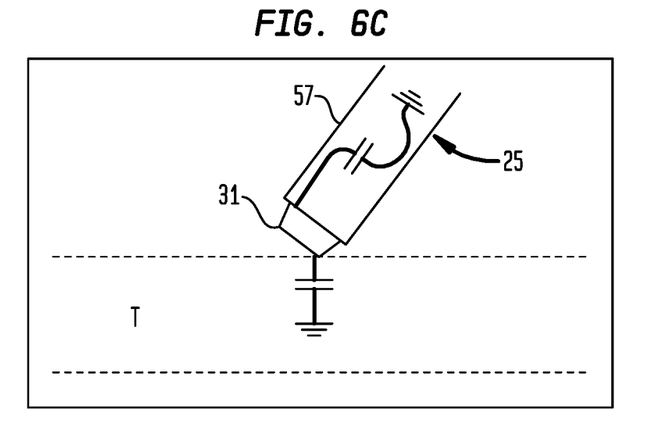
FIG. 6C is a side view of an embodiment of a hand-held controller and an eraser of the hand-held controller activating a touch screen tablet.

Now referring primarily to FIGS. 6A, 6B, and 6C, one embodiment includes a pen-shaped casing (57) for the hand-held controller (25) including a touch sensitive pad (56) in operation by way of the user's finger (F), touch sensor(s) (51), and a capacitively sensible tip (30) for interacting with a touch screen tablet (T). An eraser (31) located on the opposite end (also referred to as the eraser end of the hand-held controller (25)), also having a capacitively sensible portion can be used by a user for removing demarcations from the touch screen tablet (T) after having been made using the tip (30) on the user interface end of the hand-held controller (25).

Figure 7:
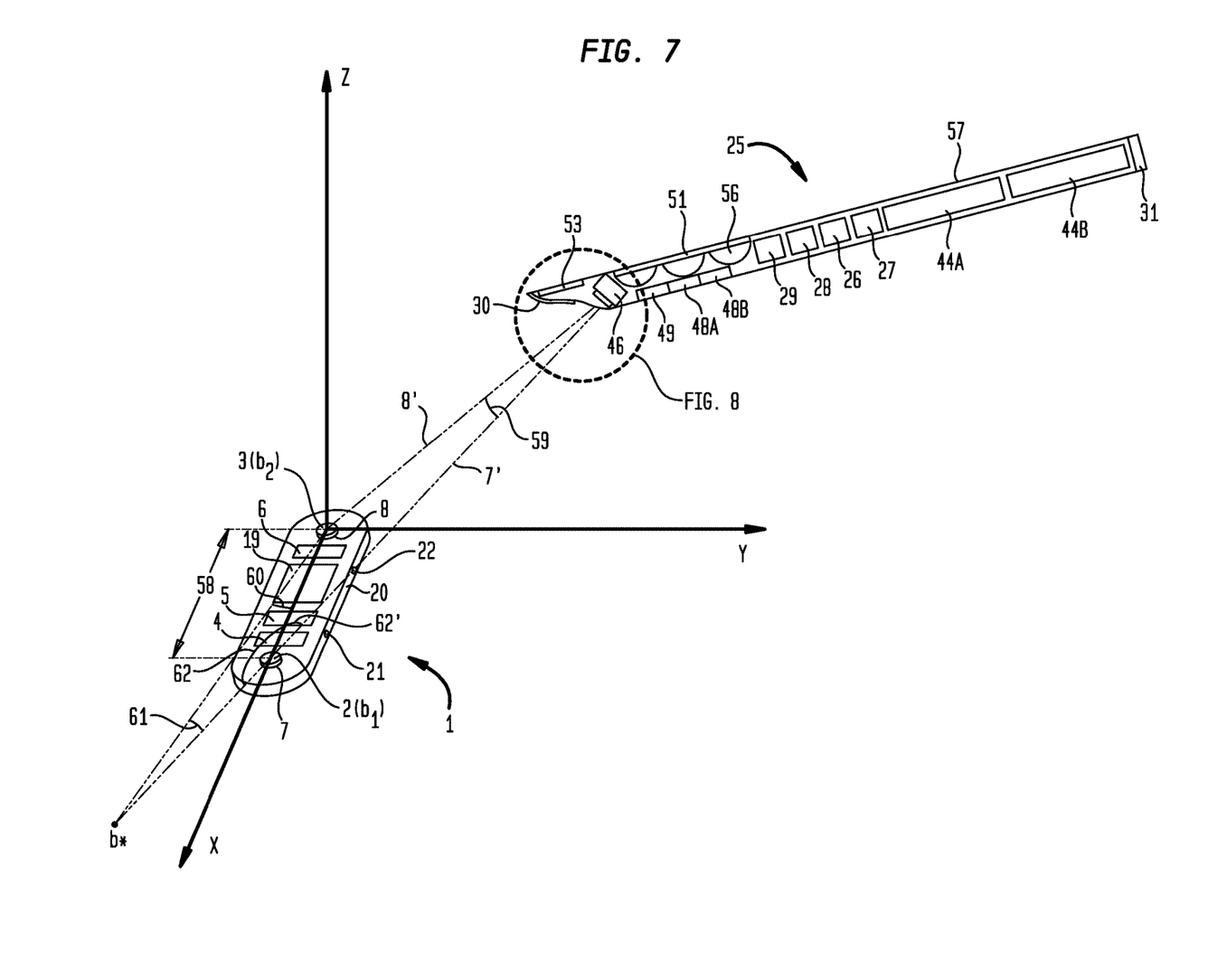
FIG. 7 illustrates an embodiment of a positional reference device in operation with a hand-held controller within a three-dimensional coordinate system.
Figure 8:
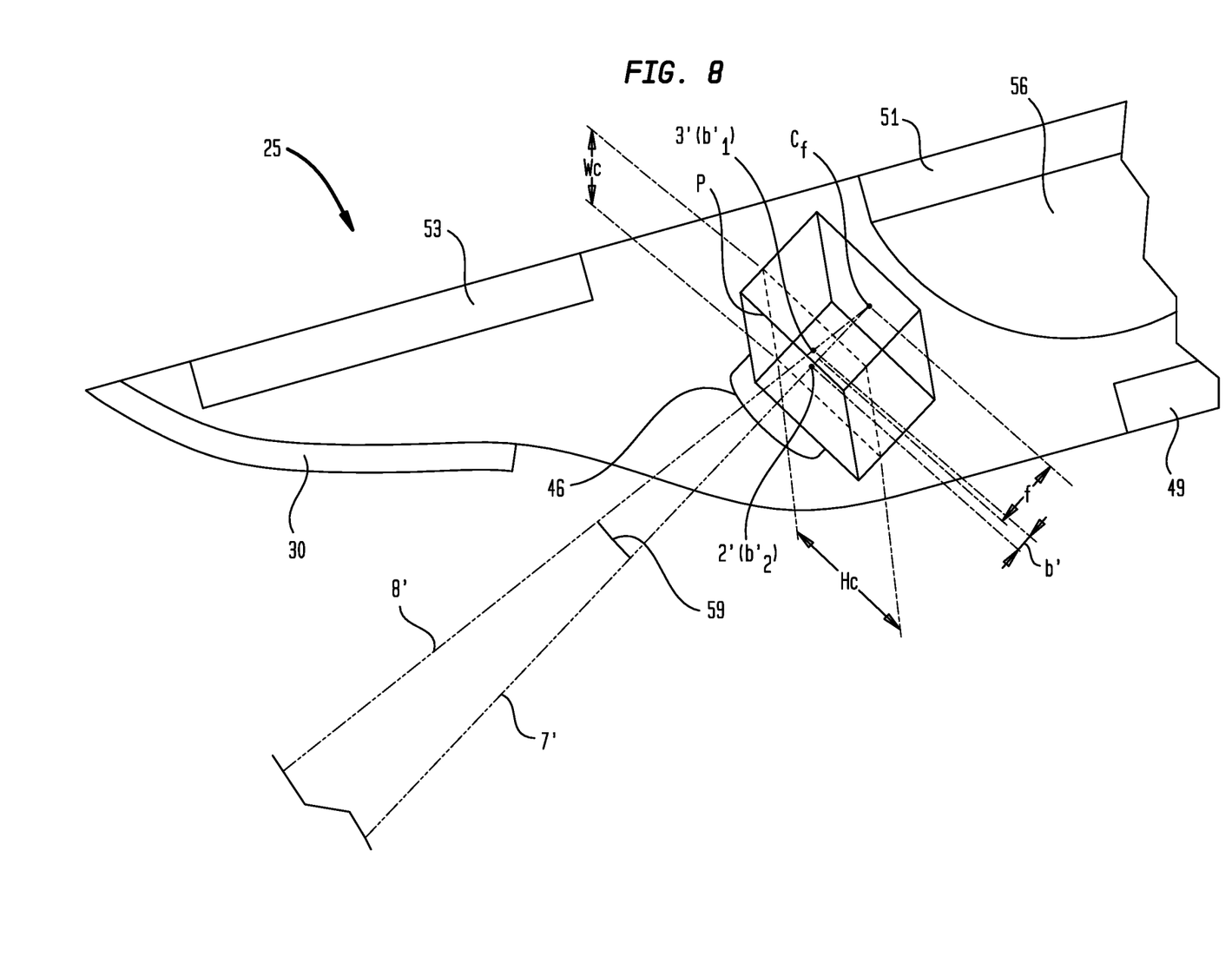
FIG. 8 illustrates an embodiment of a hand-held controller in operation with a sensor plane of the beacon sensing device.

Now referring primarily to FIG. 7 and FIG. 8, together, the hand-held controller (25) and positional reference device (1) are depicted in a three-dimensional coordinate system (X, Y, Z). In some embodiments, a three-dimensional location of the hand-held controller (25) relative to positional reference device (1) can be determined using the physical reference of the two beacons (2, 3) or the two emitters (7, 8) within the view of the beacon sensing device (46) at a fixed X, Y, Z position, where the distance (58) between the two beacons (2, 3) or emitters (7, 8) is known and constant.

In some embodiments, beacon sensing device (46) will inherently include a given set of pixel dimensions, identified as pixel width (Wc) and pixel height (Hc), as well as focal point ($C_f$) and sensor plane (P) (as shown in the illustrative example of FIG. 8). A trackable position location of the hand-held controller (25) can be determined through an application of an algorithm or algorithms, including but not limited to projective geometry perspective transformations combined with sensor signals from the inertial measurement units (48A, 48B, and 49).

For example, and with continuing reference to FIG. 7 and FIG. 8, microprocessor (26) and input/output (29) subsystems can provide an application for identifying an origin point $b_1$ which correlates to beacon (2) and identifying focal point ($C_f$) and secondary triangulation point $b_2$ which correlates to beacon (3). Next, the position of points $b_1'$ and $b_2'$ (which correspond to visualized beacons (2' and 3'), in FIG. 8) are determined along the transmission pathways of signal transmission lines (7', 8'), resulting in vector $\vec{b}'$. Finally, point ($b^*$) can be determined by using distance (58) and the angles of the triangle formed between points $b_1'$ (2'), $b_2'$ (3'), and vector $\vec{b}'$.

The physical location and orientation of the hand-held controller (25) relative to the positional reference device (1) can be described through achieving the solutions of angles $\sigma_r$, $\mu$, $\chi$, $\gamma$, and $\gamma'$ where angles $\mu$, $\chi$, and $\gamma$ of triangle $\Delta b^* b_1 b_2$ are labelled as (60), (61), and (62), respectively in FIGS. 7 through 8, and angles $\gamma'$ and $\sigma_r$ of triangle $\Delta b_1 b_2 c_f$ are labelled as (62') and (59), respectively in FIGS. 7 through 8.

Given the distance (58) is constant, the scalar value $\|\vec{r}\|$ of vector $\vec{r}$ from the direction of ($C_f$) to $b_1$ beacon (2) can be determined using the law of sines combined with the values of the solutions for calculation of angles $\sigma_r$ (59), $\mu$ (60), $\chi$ (61), $\gamma$ (62), and $\gamma'$ (62').

Therefore, in order to solve for $\sigma_r$ (59): first calculate horizontal $\theta_{1,2}$ angles and vertical $\phi_{1,2}$ angles of both beacon $b_1$ (2') and $b_2$ (3') relative to the X, Y, Z coordinates:

$$\theta_{1,2} = \alpha_H \left( \frac{x_{b_{1,2}}}{W_c} - \frac{1}{2} \right)$$

$$\phi_{1,2} = \alpha_V \left( \frac{y_{b_{1,2}}}{H_c} - \frac{1}{2} \right)$$

Where $\alpha_H$ is the beacon sensing device's (46) horizontal angle of view and $\alpha_V$ is the beacon sensing device's vertical angle of view.

Next, calculate the differences of angles and coordinates:

$$\theta_r = |\theta_2 - \theta_1|$$

$$\phi_r = |\phi_2 - \phi_1|$$

Then calculate $\sigma_r$ as the angle between detected beacon (2) and beacon (3): $\sigma_r = \cos^{-1}(\cos\theta_r \cos\phi_r)$ In order to solve for $\chi$ (61), where $\chi$ represents the angle $\angle b_1' b_2' c_f$ and equivalently $\angle b_1 b^* c_f$ having been calculated using the law of sines:

First calculate $\sigma_1$ as the angle between beacon (2) and beacon sensing device (46): $\sigma_1 = \cos^{-1}(\cos\theta_1 \cos\phi_1)$ Next, calculate the distances between beacons' (2', 3') X-Y-Z coordinates:

$$\Delta x_b = x_{b_2} - x_{b_1}$$

$$\Delta y_b = y_{b_2} - y_{b_1}$$

Calculate the scalar $\|\vec{b}'\|$ of vector $\vec{b}'$ between visualized beacons $b_1'$ (2'), $b_2'$ (3'):

$$\|\vec{b}'\| = \sqrt{\Delta y_b^2 + \Delta x_b^2} \times \frac{\text{units}}{\text{pixel}}$$

Calculate the inner angle $\chi$ between $\vec{b}'$ and vector $\vec{s}$, where vector $\vec{s}$ has a direction from $C_f$ to secondary triangulation point $b_2$ beacon (3):

$$\frac{\frac{f}{\cos\sigma_1}}{\sin(\chi)} = \frac{\|\vec{b}'\|}{\sin(\sigma_r)}$$

$$\chi = \sin^{-1}\left( \frac{f}{\|\vec{b}'\|} \frac{\sin\sigma_r}{\cos\sigma_1} \right)$$

Now, in finding a solution for $\mu$, where $\mu$ represents the angle $\angle b^* b_1 b_2$, in which $\mu$ can be extracted directly from rotation quaternion $H_r$ representing the beacon sensing device's (46) spatial orientation relative to the beacons (2, 3), given quaternions H are defined as:

geomagnetic north to the positional reference device (1) as $H_g$;

positional reference device (1) to the sensor plane (P) as $H_r$;

sensor plane (P) to the inertial measurement units (48A, 48B, 49) of the hand-held controller (25) as $H_c$;

the inertial measurement units (48A, 48B, 49) of the hand-held controller (25) to geomagnetic north as $H_d$;

combine the four quaternions or rotations $H_g$, $H_r$, $H_c$, and $H_d$ then rotate a unit vector $\vec{u}$ of length $\|\vec{r}\|$ to achieve vector $\vec{r}$. The components of vector $\vec{r}$ are the three-dimensional coordinates of focal point ($C_f$) relative to origin point $b_1$ beacon (2):

Generate rotation quaternion $H_r$ from beacons (2, 3) coordinate system to the position of the beacon sensing device (46) using the beacon $b_1$ (2):

$$\psi_r = \tan^{-1}\left( \frac{\Delta y_b}{\Delta x_b} \right)$$

$$H_r = H(\phi_1, \theta_1, \psi_r)$$

Convert quaternion $H_r$ rotation matrix R where a quaternion is:

$$H_a = a + bi + cj + dk = \begin{bmatrix} a \\ b \\ c \\ d \end{bmatrix} \begin{bmatrix} q_{a_w} \\ q_{a_x} \\ q_{a_y} \\ q_{a_z} \end{bmatrix}$$

$$R = \begin{bmatrix} \angle \hat{z}_c \hat{z}_r & \angle \hat{y}_c \hat{z}_r & \angle \hat{x}_c \hat{z}_r \\ \angle \hat{z}_c \hat{y}_r & \angle \hat{y}_c \hat{z}_r & \angle \hat{x}_c \hat{y}_r \\ \angle \hat{z}_c \hat{x}_r & \angle \hat{y}_c \hat{x}_r & \angle \hat{x}_c \hat{x}_r \end{bmatrix}$$

$$= \begin{bmatrix} a^2 + b^2 - c^2 - d^2 & 2bc - 2ad & 2bd + 2ac \\ 2bc + 2ad & a^2 - b^2 + c^2 - d^2 & 2cd - 2ab \\ 2bd - 2ac & 2cd + 2ab & a^2 - b^2 - c^2 + d^2 \end{bmatrix}$$

Extract single angle rotation from $\vec{x}_c$ to $\vec{x}_r$ from $H_r$ as $R[\vec{x}_c \vec{x}_r]$:

$$\mu = R[\vec{x}_c \vec{x}_r] = a^2 - b^2 - c^2 + d^2 = q_{r_w}^2 - q_{r_x}^2 - q_{r_y}^2 + q_{r_z}^2$$

The equations for the solutions of γ & γ' can be described where γ represents the angle ∠b*b₂b₁ and γ' is the supplement (γ+γ'=180°) of γ, as follows:

$$\gamma' = 180° - \gamma = 180° - \mu - \chi$$

$$\gamma = \mu + \chi$$

Next, in solving for $\|\vec{r}\|$ where γ, $\sigma_r$, and distance (58) (symbolized in the equation below as $\|\vec{d}\|$) are known, $\|\vec{r}\|$ can be calculated using the law of sines:

$$\frac{\|\vec{r}\|}{\sin(\gamma)} = \frac{\|\vec{d}\|}{\sin(\sigma_r)}$$

$$\|\vec{r}\| = \frac{\sin(\gamma)}{\sin(\sigma_r)} \times \|\vec{d}\|$$

Vector $\vec{r}$ can be a unit vector $\vec{u}$ multiplied by the scalar $\|\vec{r}\|$ and rotated by the combined rotation quaternions of the full system: $H_d$, $H_c$, $H_r$, and $H_g$. $H_d$ is actively calculated using the inertial measurement units (48A, 48B, 49) of the hand-held controller (25). $H_c$ is the pre-calculated rotation offset between the inertial measurement units (48A, 48B, 49) and the sensor plane (P) of the beacon sensing device (46). $H_r$ is calculated as previously described above. $H_g$ is the pre-calculated rotation offset of positional reference device (1) and geomagnetic north.

Combine all quaternions into $H_a$:

$$H_a = H_d H_c H_r H_g$$

Rotate a unit vector $\vec{u}$ of length $\|\vec{r}\|$ by $H_a$ and extract final coordinates:

$$\vec{r} = H_a(\|\vec{r}\|\vec{u})$$

$$(x, y, z)_d = \left[\hat{i} \vec{r}_r, \hat{j} \vec{r}_r, \hat{k} \vec{r}_r\right]$$

In another embodiment, the location of the hand-held controller (25) can be calculated without any additional information from the accelerometer (48A), gyroscope (48B), or magnetometer (49).

Various other methods may be used to compute and ultimately determine the position and orientation of the hand-held controller (25) relative to the positional reference device (1), based on the data and information from the beacon sensing device (46) and inertial measurement units (48A, 48B, 49). As an example of one such method, an algorithm known as linear quadratic estimation which uses a series of measurements observed over time can be used. In linear quadratic estimation, statistical noise and other inaccuracies are inclusive while generating estimates of unknown variables that are statistically more accurate than any single, sole measurement. It should be appreciated that additional methods that use Bayesian inference and joint probability distribution are contemplated by the present embodiments, as well.

Figure 9:
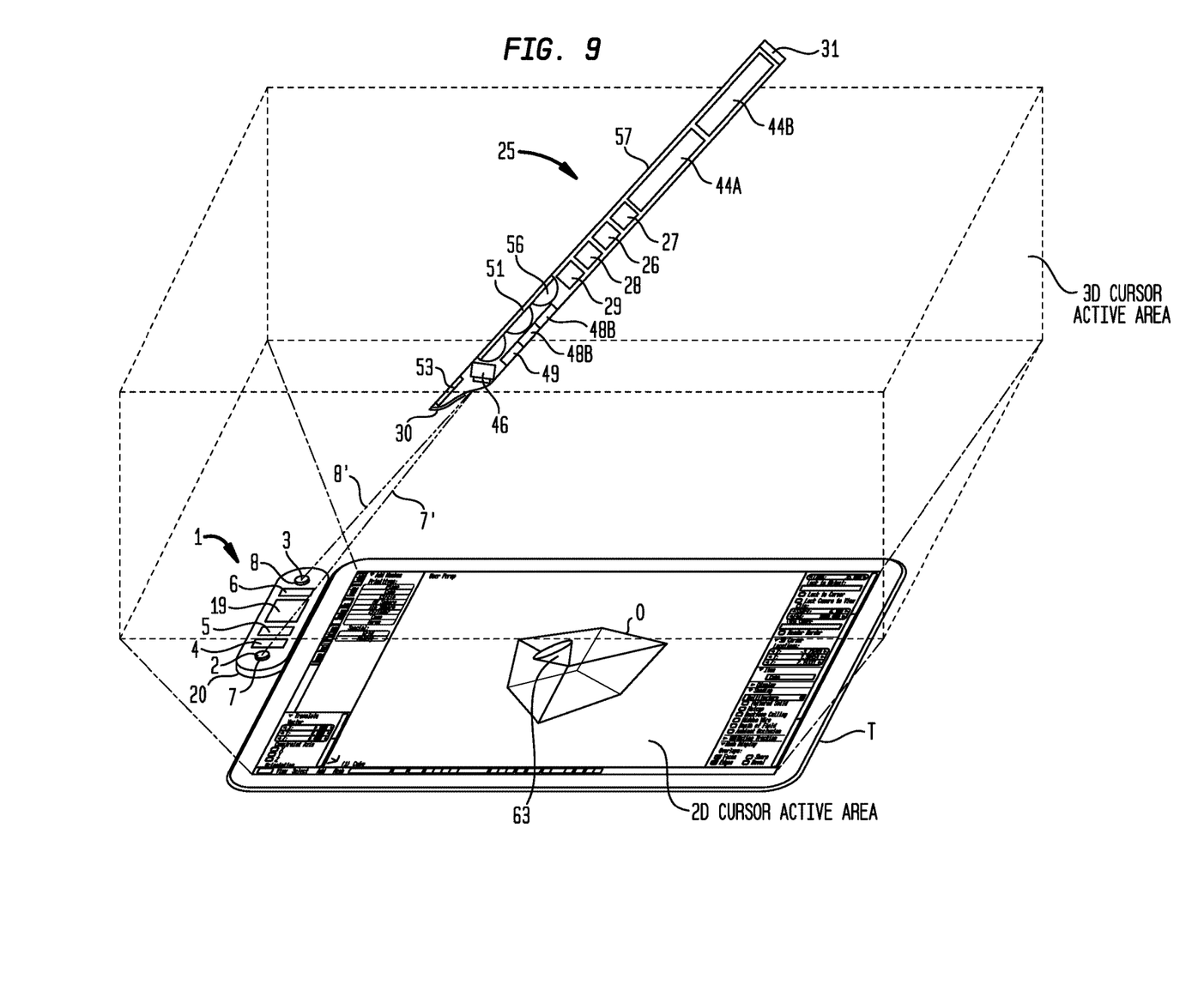
FIG. 9 illustrates an embodiment of a positional reference device in operation with a hand-held controller within a three-dimensional cubic region.

Now referring primarily to FIG. 9. hand-held controller (25) is illustrated in a three-dimensional cursor active volume which has been mapped below from a two-dimensional cursor active area. Positional reference device (1) is stationary and positioned adjacent to touch screen tablet (T) via magnets (21, 22). Three-dimensional cursor (63), as shown on object (O) of the touch screen tablet (T) may be part of any commercially available three-dimensional computer aided design system, using either vector-based graphics to depict the objects of traditional drafting, or producing raster graphics, which show the overall appearance of designed objects.

Figure 10:
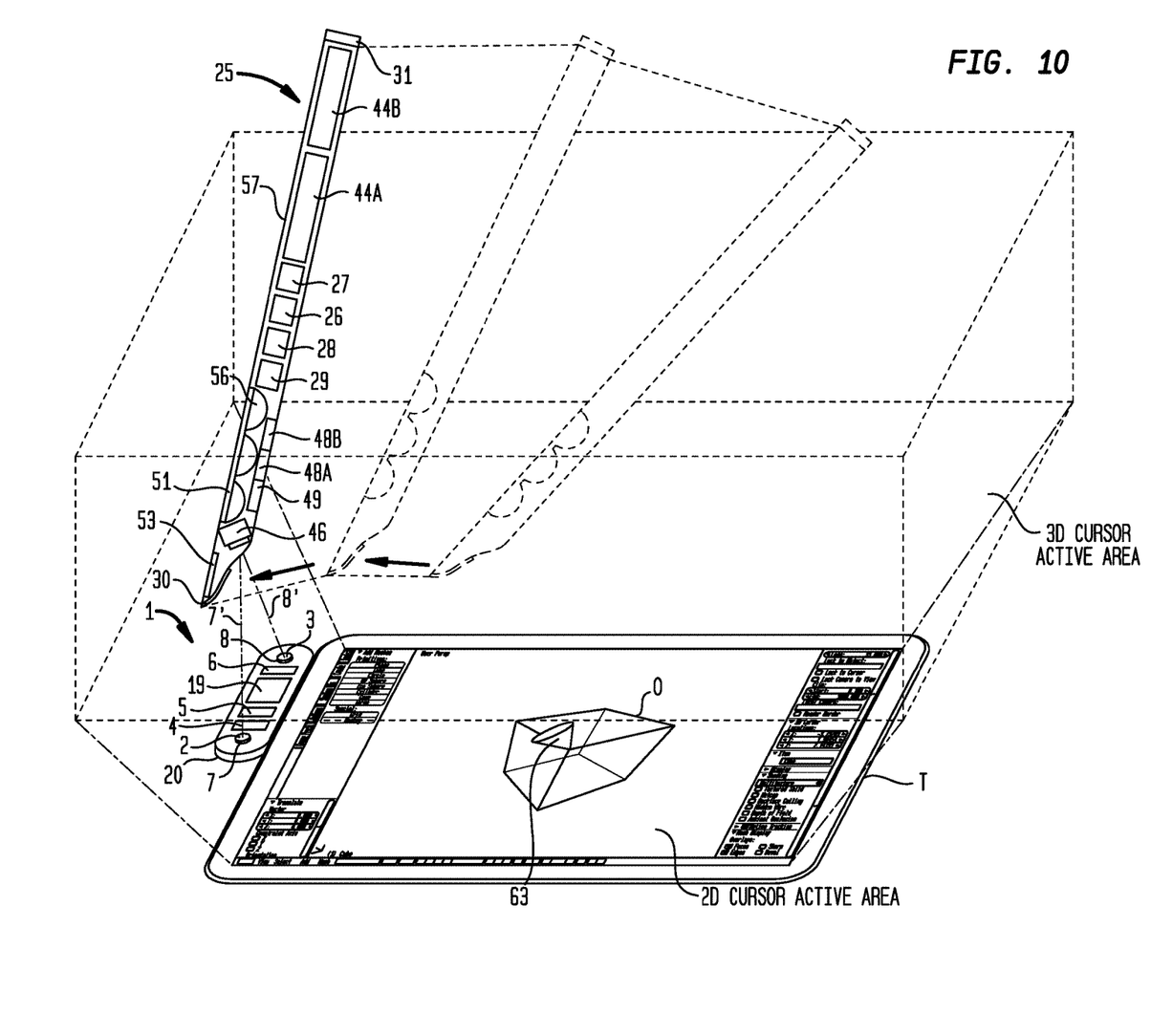
FIG. 10 illustrates an embodiment of a positional reference device in operation with a hand-held controller as it is positioned and oriented within a three-dimensional cubic region.

With reference to FIG. 10, in some embodiments, a user may move the hand-held controller (25) within the three-dimensional cursor active volume for positional location and orientation tracking of the hand-held controller (25), such that the physical location and orientation of the hand-held controller thereby becoming precisely correlated to the display of the three-dimensional cursor (63) on the touch screen tablet (T). Thus, as the user moves the hand-held controller (25) the corresponding three-dimensional cursor (63) is repositionable within the two-dimensional surface area of the touch screen tablet (T).

Figure 11:
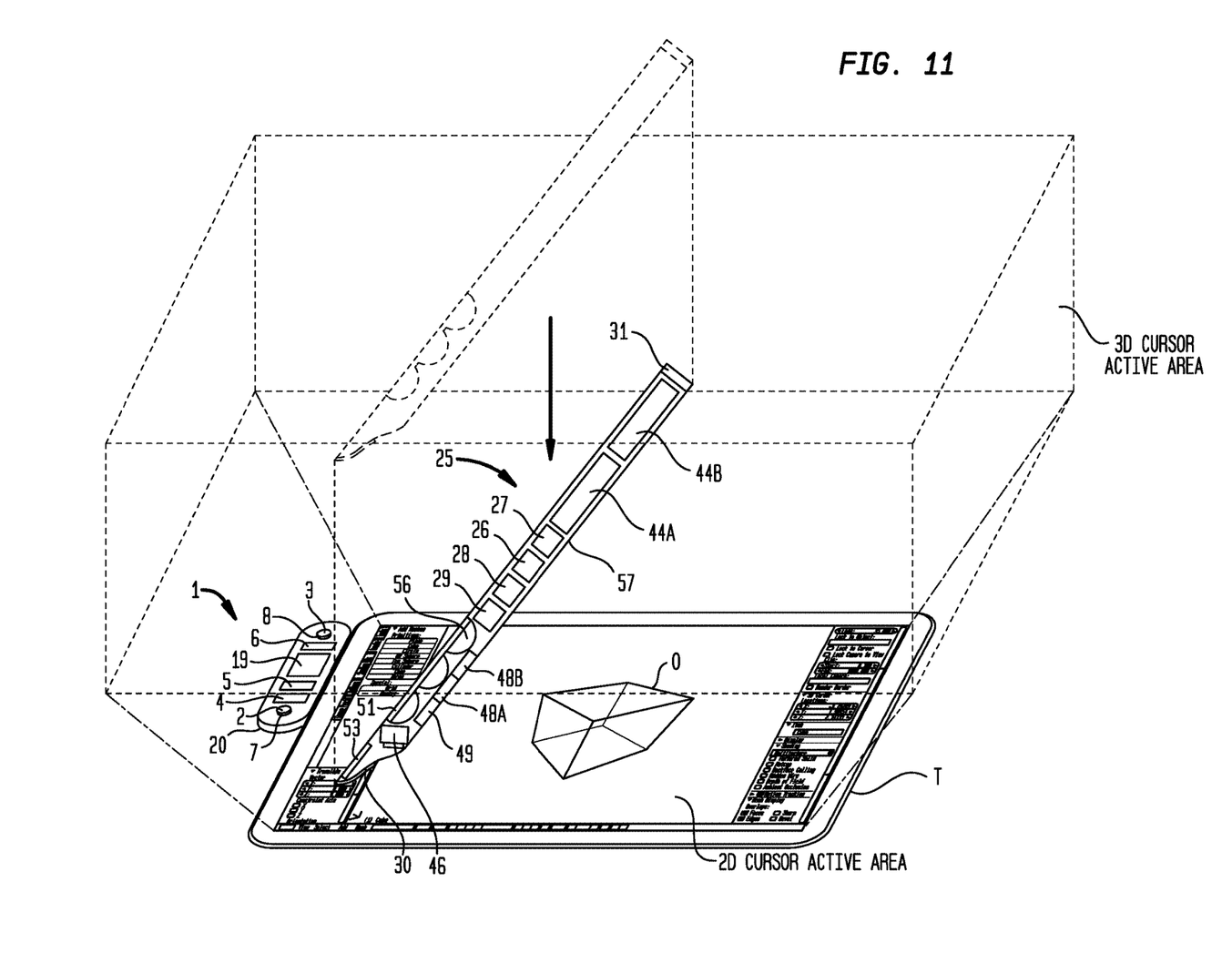
FIG. 11 illustrates an embodiment of a positional reference device in operation with a hand-held controller as it is relocated from a three-dimensional cubic region to a two-dimensional area of a touch screen tablet.

Referring primarily to FIG. 11, in some embodiments, the hand-held controller is operable between the two different dimensioned environments. For example, a user may move the hand-held controller (25) within the three-dimensional cursor active volume for positional location and orientation of the hand-held controller (25), then engage the two-dimensional active area by physically touching the hand-held controller (25) to the touch screen table (T). It should be appreciated any or all conventional functionality that exists between commercially available styli and touch screens is contemplated by the present embodiments.

Figure 12:
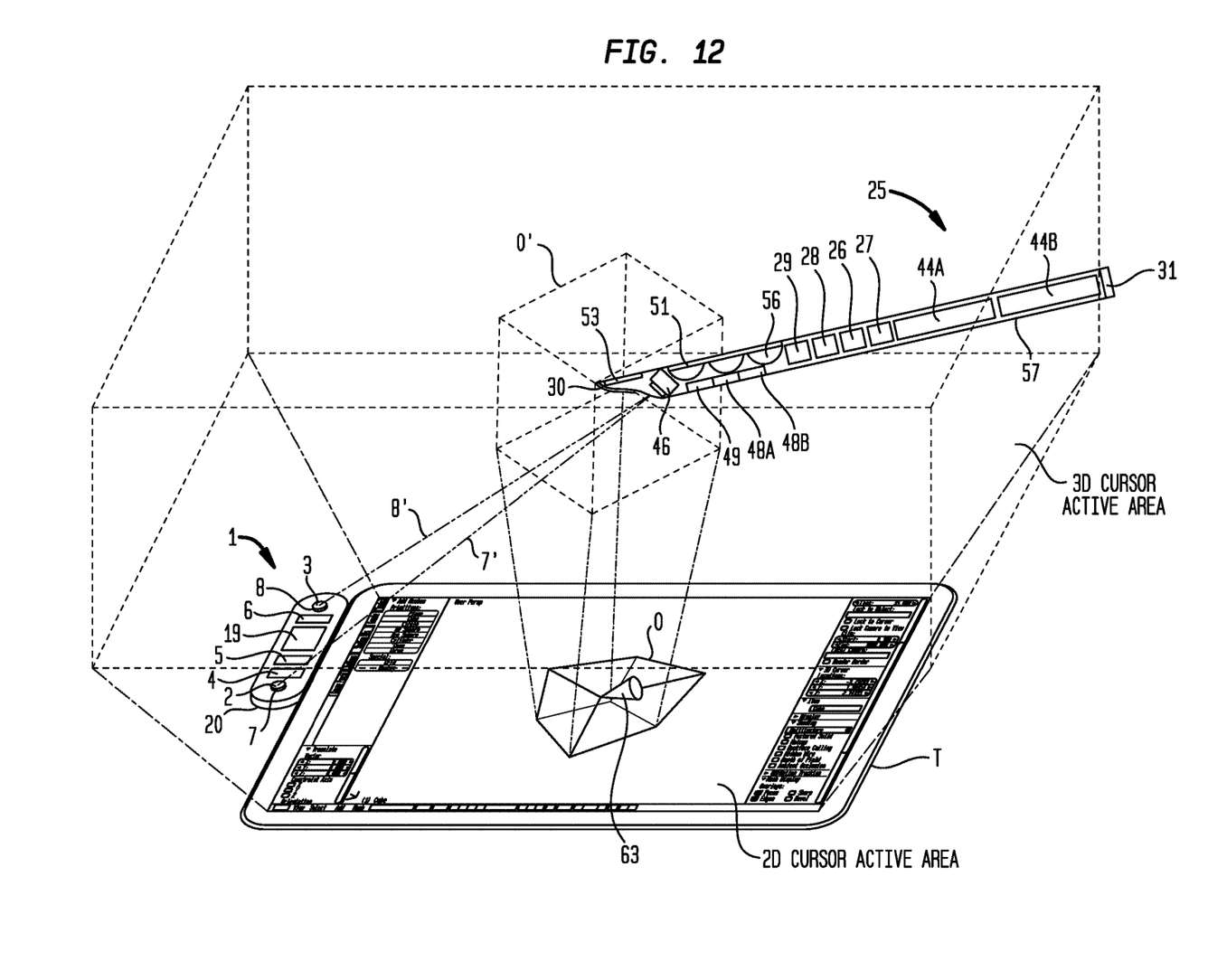
FIG. 12 illustrates an embodiment of three-dimensional object as displayed in an example computer aided design program while using a positional reference device in operation with a hand-held controller.

Now referring primarily to FIG. 12, three-dimensional cursor (63) is repositionable on object (O) on the touch screen tablet (T) display. Object (O) can be represented within the three-dimensional cursor active volume as a virtual object (O') in three-dimensional space, thereby permitting the user to use the hand-held controller (25) for manipulating the virtual object (O') in the three-dimensional cursor active volume. It should be appreciated various holographic and stereographic displays may be used so that the object (O) on the touch screen tablet (T) appears coincident with the object's (O) virtual representation (O') in the three-dimensional cursor active volume.

As can be easily understood from the foregoing, the basic concepts of the present invention may be embodied in a variety of ways. The invention involves numerous and varied embodiments of a system for conducting a performance analysis of a radio frequency generator and methods for using such a system and the component parts including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "hand-held controller" should be understood to encompass disclosure of the act of "controlling a hand-held device"—whether explicitly discussed or not—and, conversely, were there effectively disclosure of the act of "controlling a hand-held device", such a disclosure should be understood to encompass disclosure of a "hand-held controller" and even a "means for controlling a hand-held device." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the systems for a positional reference device and hand-held controller disclosed and described, ii) the related devices and methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

What is claimed is:

1. An electronic device comprising:
a positional reference indicator comprising at least two location beacons coupled to said positional reference indicator in a fixed spaced apart relation, defining a fixed distance;
a hand-held controller comprising absolute orientation sensors, including a gyroscope, a magnetometer, and an accelerometer, said absolute orientation sensors generating sensor signals which vary based upon movement of said hand-held controller, wherein said sensor signals generated by said absolute orientation sensors comprise linear motion, rotation in space comprising roll $\phi$, pitch $\varphi$, and yaw $\psi$, and earth's magnetic fields;
a beacon sensing device comprising a camera housed within said hand-held controller, said beacon sensing device generating reference data when positioned to sense said at least two location beacons; and a processor which receives said sensor signals and said reference data, said processor communicatively coupled to a non-transitory computer readable medium containing computer-executable instructions executable to compute a position and an orientation of said hand-held controller relative to said positional reference indicator, wherein said position and said orientation of said hand-held controller relative to said positional reference indicator comprises a three-dimensional coordinate positional location of said hand-held controller and an absolute orientation of said hand-held controller within two different dimensioned environments comprising a two-dimensional active area and a three-dimensional active volume;

wherein said magnetometer operably coupled in conjunction with said beacon sensing device to generate said three-dimensional coordinate positional location of said hand-held controller and said absolute orientation of said hand-held controller from a two-dimensional image comprising said at least two location beacons at said fixed distance.

2. The device of claim 1, wherein said at least two location beacons comprise light emitters generating infrared light.

3. The device of claim 1, wherein said hand-held controller comprises an approximately pen shaped stylus.

4. The device of claim 3, wherein said approximately pen shaped stylus comprises a user interface end and an eraser end.

5. The device of claim 4, wherein said user interface end of said approximately pen shaped stylus comprises a capacitively sensible tip.

6. The device of claim 5, wherein said eraser end of said approximately pen shaped stylus comprises a capacitively sensible portion.

7. The device of claim 1, wherein said absolute orientation sensors are selected from one or more of an acceleration sensor, a vibration sensor, a shock sensor, a tilt sensor, and a rotation sensor.

8. The device of claim 7, wherein said absolute orientation sensors are selected from one or more of a multiaxis gyroscope, a multiaxis magnetometer, and a multiaxis accelerometer.

9. The device of claim 1, wherein said movement of said hand-held controller comprises at least one of acceleration, vibration, shock, tilt, and rotation.

10. The device of claim 1, wherein said hand-held controller comprises a radio frequency generator housed within said hand-held controller.

11. The device of claim 10, wherein said hand-held controller comprises a sensor housed within said hand-held controller, said sensor in operable communication with said capacitively sensible tip.

12. The device of claim 11, wherein said hand-held controller comprises a touch-sensitive pad positioned on an outer casing of said hand-held controller.

13. The device of claim 1, wherein said positional reference indicator comprises one or more magnets coupled to said positional reference indicator to allow said positional reference indicator to attach to a laptop computer.

* * * * *